United States Patent [19]
Hagglund

[11] 3,811,785
[45] May 21, 1974

[54] INTERCONNECTION ELEMENT SYSTEM

[76] Inventor: Ruben Jakob Valdemar Hagglund, 570 70 Hogsby, Sweden

[22] Filed: Dec. 15, 1972

[21] Appl. No.: 315,775

[30] Foreign Application Priority Data
Dec. 17, 1971 Sweden.......................... 16196/71

[52] U.S. Cl................ 403/255, 52/758 H, 403/264
[51] Int. Cl............................................. F16b 7/04
[58] Field of Search .......... 403/231, 240, 254, 255, 403/256, 264, 403; 52/758 H

[56] References Cited
UNITED STATES PATENTS

| | | | |
|---|---|---|---|
| 2,855,255 | 10/1958 | Sonderstrup | 403/256 |
| 3,338,602 | 8/1967 | Arnd | 403/264 |
| 3,456,966 | 7/1969 | Muller | 52/758 H |
| 3,458,052 | 7/1969 | Kann | 403/255 X |
| 3,580,620 | 5/1971 | Offenbroich | 403/264 X |
| 3,608,938 | 9/1971 | Murdock | 403/264 X |
| 3,672,710 | 6/1972 | Kroopp | 403/255 X |

Primary Examiner—Werner H. Schroeder
Attorney, Agent, or Firm—Sughrue, Rothwell, Mion, Zinn & Macpeak

[57] ABSTRACT

An interconnection element system for rigidly interconnecting substantially hollow, profiled tubes in simple manner by means of concealed interconnection elements. The interconnection elements clamp an extending end of one of the profiled tubes against the other tube, and the two profiled tubes are locked against each other by means of a wedge introduced into the first profile tube and engaging the interconnection elements.

5 Claims, 7 Drawing Figures

PATENTED MAY 21 1974 3,811,785
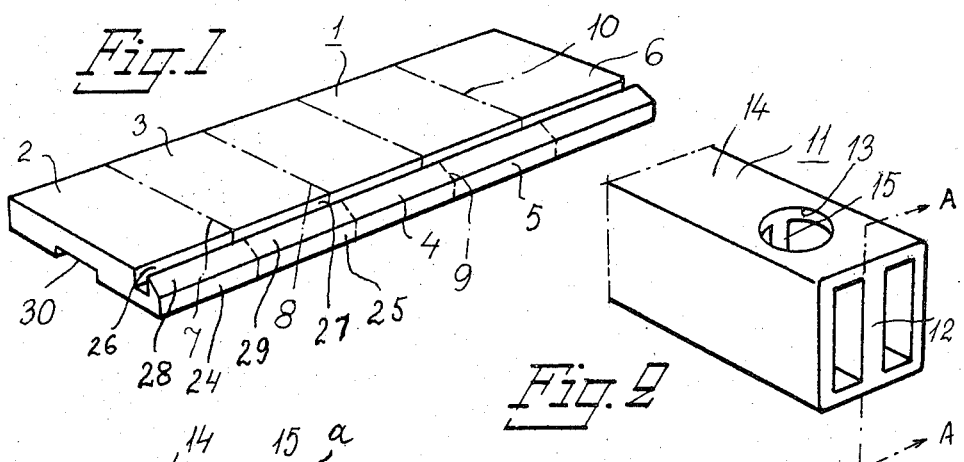
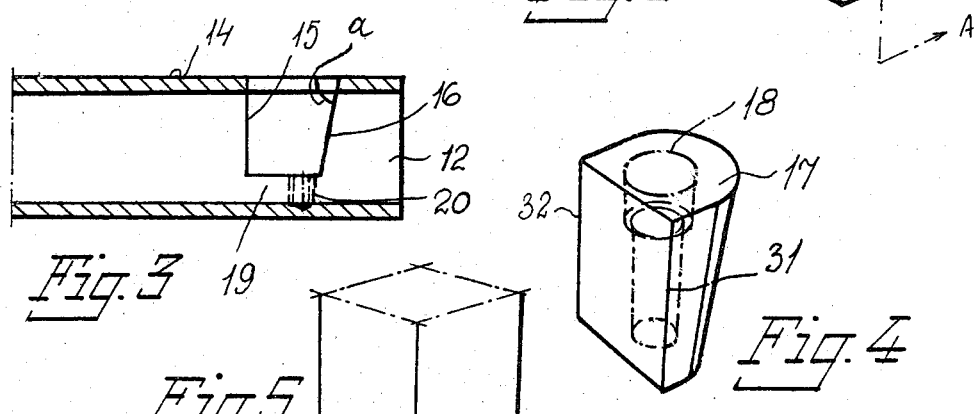
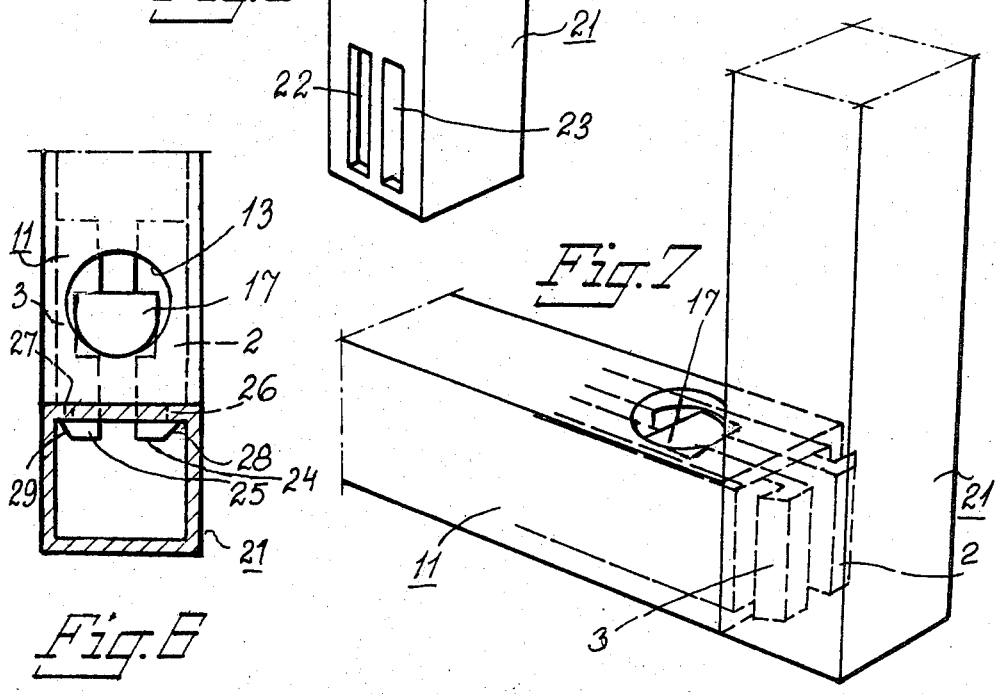

INTERCONNECTION ELEMENT SYSTEM

BACKGROUND OF THE INVENTION

A great many different types of interconnection elements may be found in the market, for example for connecting profiled tubes to each other when utilized as supporting columns in frames for furniture adapted to be assembled on the spot, etc. When these interconnection elements are used, the joint between the profiled tubes will normally be visible on several sides of the profile, for instance as the result of the necessity of providing penetrating apertures on two opposite sides of the profile. Hence, it is not possible to conceal these apertures from an observer. In joining profiled tubes in corners it is often possible to utilize elements having visible engagement blocks, but also in this case the joint becomes pronounced by the engagement block often having an appearance that differs from that of the profiled tube itself.

SUMMARY OF THE INVENTION

This invention refers to an interconnection element system for rigidly securing profiled tubes together in simple manner without any pronounced joint being visible and of keeping these profiled tubes clamped to each other in predetermined positions.

The object of the invention is to disclose a novel type of interconnection element that may be utilized together with profiled tubes and that has the advantages of being easy to assemble and providing a very sturdy coupling and that the only intervention that is necessary is providing an aperture on the inside of the profiled tube, wherein it is possible to turn said aperture in such position, when the profiled tube is mounted, that the aperture will not be visible to an observer, thereby making the appearance of the interconnection aesthetically attractive. The means by which this object is achieved are defined in the accompanying claims.

BRIEF DESCRIPTION OF THE DRAWING

An embodiment of the invention will be described more specifically below with reference to the accompanying drawing, in which FIG. 1 shows an extruded profile, from which the interconnection element in accordance with the invention may be obtained, FIG. 2 shows a perspective view of a profiled tube which in accordance with the invention is adapted to be interconnected with a second profiled tube, FIG. 3 shows a section along the line A—A of FIG. 2 and illustrates a longitudinal intermediate beam in the profiled tube of FIG. 2, with an oblique bore in said beam appearing in FIG. 3, FIG. 4 is a perspective view of an obliquely cut wedge for locking interconnecting pieces or interconnection elements in accordance with the invention in place, FIG. 5 is a perspective view of a portion of a profiled tube utilized in accordance with the invention and including two slits, each adapted for receiving an individual interconnection element, FIG. 6 shows the profiled tube in accordance with FIG. 2 as viewed from above with two interconnection elements introduced into position and a cross-section of a second profiled tube adapted to be secured to the first profiled tube, with the wedge corresponding to FIG. 4 being introduced into its clamping position, and FIG. 7 shows a perspective view illustrating two profiled tubes disposed at right angles to each other and clamped to each other by means of interconnection elements and a wedge clamp in accordance with the invention.

DESCRIPTION OF THE PREFERRED EMBODIMENT

The designation 1 in FIG. 1 refers to an extruded piece of material, for instance in the form of an extruded aluminum profile, which easily may be divided into a plurality of individual interconnection elements 2, 3, 4, 5, and 6 by cutting along the dot-dash lines 7, 8, 9, and 10. These interconnection elements are intended for interconnecting profiled tubes as disclosed by this invention, and they may take various shapes. The illustrated embodiment should thus merely be regarded as an example.

FIG. 2 shows a profiled tube 11 that has been chosen as an example and that may be utilized in applying the invention. For instance, this profiled tube may be made of eloxidized aluminum and may include a solid intermediate beam 12 of aluminum extending centrally in the longitudinal direction of the entire profiled tube. A bore 13 is located at right angles to the elongated top 14 of the profiled tube and is centered in the lateral direction of the profiled tube. The bore 13 continues downwards into the beam 12. The right-hand side of the bore is oblique, whereby the walls defining the bore are provided with the appearance illustrated by the edge portions 15 and 16 of the beam 12 in FIG. 3. The edge portion 15 may also be seen in FIG. 2. Hence, it is obvious that the edge portion 15 of the bore lies at a right angle to the longitudinal side 14 of the profiled tube, whereas the other edge portion 16 of the bore forms an angle α, which is smaller than 90°, with respect to the longitudinal side 14 of the profiled tube.

FIG. 4 shows a wedge 17 that is provided for being introduced through the aperture 13 for engaging the beam edge portions 15 and 16, respectively, of FIG. 3, wherein said engagement is to form a tight fit when the wedge has been introduced altogether. However, before the wedge 17 is introduced, a pair of interconnection elements of the type illustrated by FIG. 1 should be disposed mutually symmetrically in the profiled tube 11 of FIG. 2. As may be seen in FIG. 1, these interconnection elements are provided with recesses 30 with the intention that the edges 31 and 32 of the wedge 17 are to engage the corresponding edges of recess 30 in each of the interconnection elements for clamping the interconnection elements in the profiled tube. This will be disclosed more specifically below.

In FIG. 4 the wedge 17 is shown provided with a counter-sunk bore 18 which will be described more in detail below and which may be omitted if desired.

The procedure in assembling interconnection elements in accordance with the invention will now be described with particular reference to FIGS. 5 and 6, respectively. FIG. 5 shows a profiled tube 21 which is provided with two slits or milled sections 22 and 23, the sizes of which are selected such, that the foremost ends of two interconnection elements, for example 24 and 25 in accordance with FIG. 1, may be introduced therein. The interconnection elements are provided with grooves 26 and 27 at their foremost ends, and furthermore they are tapered (at 28 and 29, respectively) so that they may be "folded" into the slits 22, 23 of the profiled tube 21 in such fashion that the material surrounding the grooves 26, 27 in the interconnection elements will snugly engage those walls of the profiled tube 21 that are illustrated in cross-section in FIG. 6, with the pointed edges of the foremost portions at the ends of the tapers 28 and 29 facing away from each other in the manner illustrated in FIG. 6. After the interconnection elements have been secured in the profiled tube 21 as indicated above, the profiled tube 11 is slid onto the two interconnection elements 2 and 3, respectively, to the position illustrated in FIG. 6, whereafter wedge 17 is introduced through aperture 13 and is urged down to its bottom position, for instance by lightly knocking on it or by tightening a screw which may be introduced into the above-mentioned bore 18 in the wedge 17 and which extends down through a thread 20 in the bottom portion 19 of the beam 12. The principle of the interconnection in accordance with FIG. 6 is illustrated in a perspective view in FIG. 7.

The invention is not restricted to the embodiment described above and illustrated in the drawing, and a plurality of variations and modifications may exist. Thus, tubes having some other profile rather than a square one may very well be utilized, for example a rectangular profile or even a circular profile. The only requirement is that the profiles must be adapted to each other at the place of interconnection and that one of the profiles must be provided with a beam portion that may be utilized for clamping or securing at least one interconnection element that cooperates with the other profile by means of a wedge engagement. The beam portion does not have to be located symmetrically in the profile, and thus it is not necessary to utilize two interconnection elements as in the example described above, Hence, it may be sufficient with one single interconnection element.

The extruded profile 1, from which the individual interconnection elements are obtained, can be made of an arbitrary appropriate material. Of course the individual interconnection elements 2, 3, 4, 5, and 6 may also be made individually and in any suitable manner, and they may naturally also have other shapes.

The invention makes it possible to achieve a very rigid interconnection of profiles, with only the aperture 13 being visible at the joint, and furthermore this only occurs in one single place that to advantage may be located in such position that it normally is not visible, for instance on the lower side of the frame of a piece of furniture. Moreover, if desired, the aperture may be covered by an appropriate plug made of for example rubber or plastic. The invention is not restricted to the application illustrated above as an example, and profiled tubes for a variety of purposes may be secured to each other in accordance with the principles of the invention.

I claim:

1. A system of substantially concealed interconnection elements for securing profiled tubes in direct engagement with each other, comprising
   a. a first profiled tube,
   b. a second profiled tube,
   c. a beam extending intermediately to two walls located opposite to each other in said first profiled tube at least at an end of said first profiled tube that is adapted for being secured to said second profiled tube, two apertures thus being formed in said end,
   said second profiled tube being provided with at least one recess at a place where the profiled tubes are adapted to engage each other for being secured to each other,
   d. at least one interconnection element,
   said at least one interconnection element mating with an individual one of said apertures and an individual one of said recesses for being secured in the second profiled tube while extending from this profiled tube into the first profiled tube in close relationship to the interior walls of the first profiled tube as well as to the wall of said beam,
   e. a bore provided in said beam,
   said bore having one defining wall extending substantially at right angles to the longitudinal direction of the first profiled tube and having a second defining wall lying at an angle of less than 90° with respect to the longitudinal direction of the first profiled tube, and
   f. a wedge mating with the bore of said beam and with a recess in said at least one interconnection element,
   said wedge clamping the first and second profiled tubes together upon its introduction into said bore by securing said at least one interconnection element in said first and second profiled tubes.

2. A system in accordance with claim 1, wherein two interconnection elements are utilized.

3. A system in accordance with claim 1, wherein said beam is located centrally in said first profiled tube.

4. A system in accordance with claim 1, wherein said beam extends through the entire first profiled tube in the longitudinal direction thereof.

5. A system in accordance with claim 1, wherein said interconnection element comprises an extruded aluminum profile.

* * * * *